United States Patent
Hundscheidt

(10) Patent No.: US 6,757,266 B1
(45) Date of Patent: Jun. 29, 2004

(54) COMMUNICATION SYSTEM METHOD FOR SETTING UP CONNECTIONS BETWEEN TERMINALS OF A FIRST AND SECOND COMMUNICATION NETWORK

(75) Inventor: Frank Hundscheidt, Kerkrade (NL)

(73) Assignee: Telfonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/354,343

(22) Filed: Jul. 16, 1999

(30) Foreign Application Priority Data

Jul. 17, 1998 (DE) ......................................... 198 32 290

(51) Int. Cl.[7] .................................................. H04J 3/24

(52) U.S. Cl. ...................................... 370/328; 370/352

(58) Field of Search ................................. 370/352, 353, 370/355, 356, 357, 359, 360, 362, 376, 431, 465, 328, 400, 401

(56) References Cited

U.S. PATENT DOCUMENTS

| | | | | |
|---|---|---|---|---|
| 6,061,346 A | * | 5/2000 | Nordman ..................... | 370/352 |
| 6,061,650 A | * | 5/2000 | Malkin et al. ............... | 704/228 |
| 6,147,986 A | * | 11/2000 | Orsic ........................... | 370/349 |
| 6,298,060 B1 | * | 10/2001 | Miyakawa et al. .......... | 370/400 |
| 6,396,828 B1 | * | 5/2002 | Liu .............................. | 370/352 |

FOREIGN PATENT DOCUMENTS

| | | |
|---|---|---|
| WO | 96/34504 | 10/1996 |
| WO | 98/24259 | 6/1998 |

OTHER PUBLICATIONS

Reynolds, et al., "Telnet Protocol Specification", Network Working Group, Request for Comments: 854, pp. 1–15, May 1983,.
J. Postel et al., "Telnet Protocol Specification", Request for Comments: 764, pp. 15, Jun. 1980.
GSM Technical Specification XP–002119756, "Support of Optimal Routeing", ETSI, Jul. 1996.
Meier–Hellstern, K. et al., "Network protocols for the cellular packet switch," IEEE Transactions on Communications 42: 2/3/4, pp 1235–1244, 1994.

* cited by examiner

Primary Examiner—Wellington Chin
Assistant Examiner—William Schultz

(57) ABSTRACT

The invention relates to a method and a communication system (SYS) for setting up connections from a first terminal (TE) of a first communication network (TCP/IP) to a second terminal (MS) of a second communication network (PLMN). A specific access server (AS) is selected on the basis of the location (LA) of the second terminal (MS) and/or on the basis of call processing related features (CPC) necessary for handling the call in the first and/or second communication network (TCP/IP, PLMN). Thus, always the optimal access server (AS), e.g. nearest to the second terminal (MS) can be selected, together with the appropriate functionalities needed for supporting the call in the networks. The invention is particularly advantageous if the first communication network (TCP/IP) is a packet switched network and the second communication network is a circuit switched network, since in this case the advantages of a packet switching can be maintained as much as possible and the circuit switched call is only needed over the shortest possible distance to the switching means (MSC/VLR) of the second communication network (PLMN). Thus, the resources of both networks are used optimally.

6 Claims, 8 Drawing Sheets

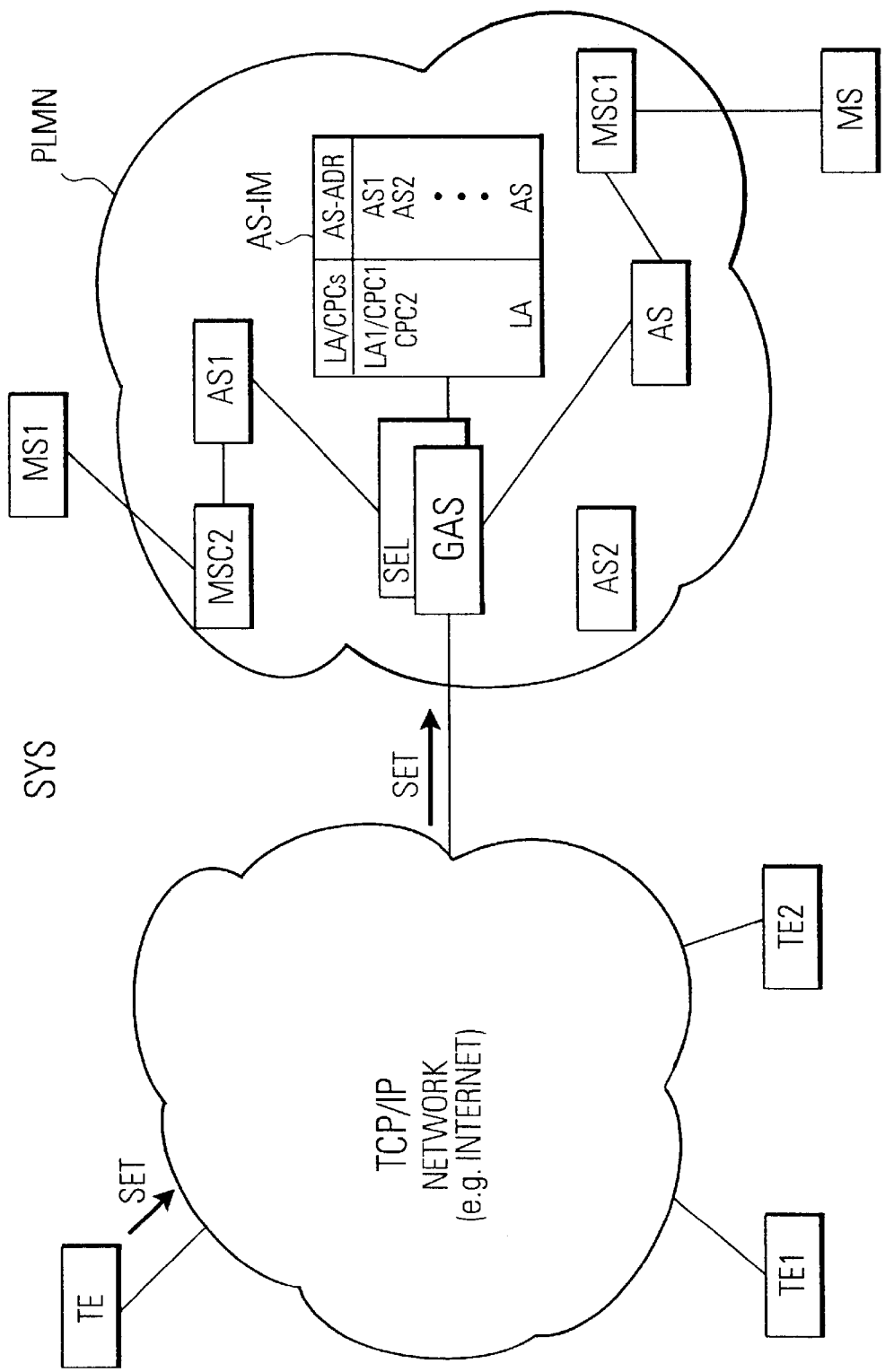

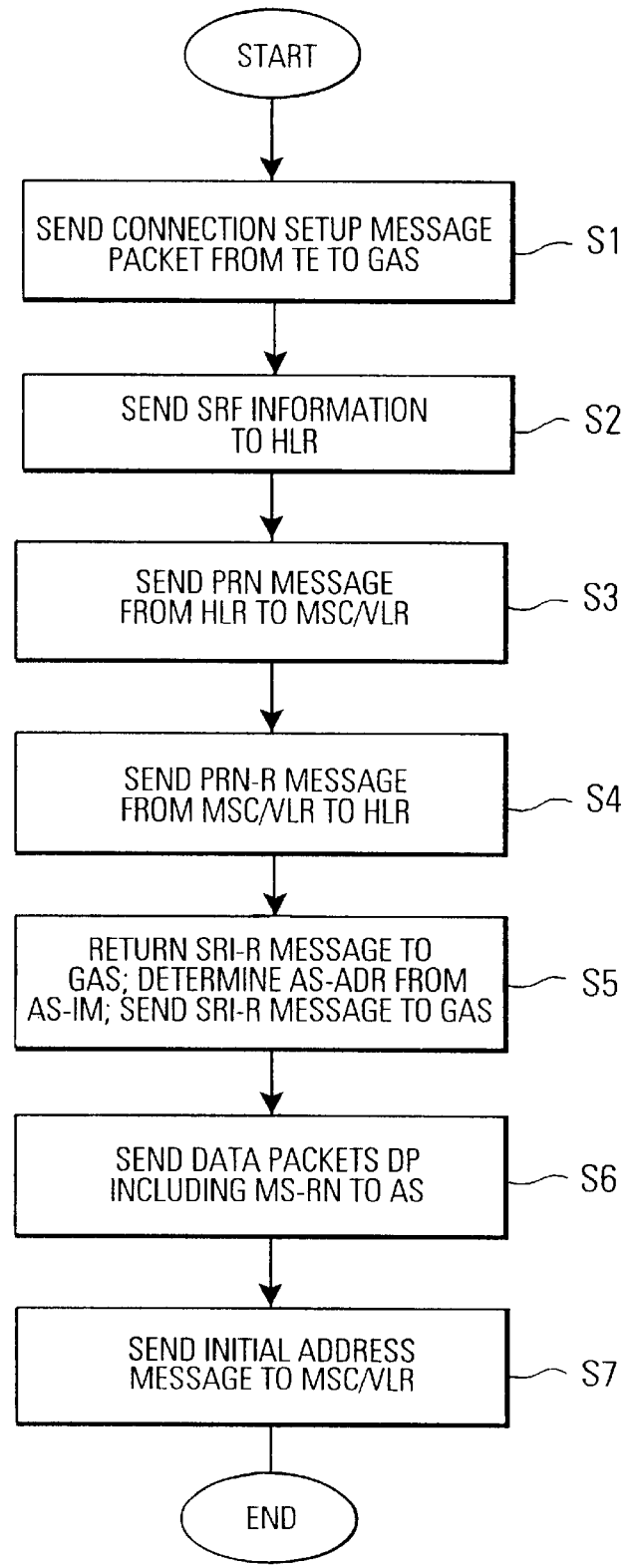

COMMUNICATION SYSTEM METHOD FOR SETTING UP CONNECTIONS BETWEEN TERMINALS OF A FIRST AND SECOND COMMUNICATION NETWORK

FIELD OF THE INVENTION

The invention relates to a method for setting up connections or calls in a communication system including at least one first communication network having a number of first terminals connected thereto and at least one second communication network having a number of second terminals connected thereto. The connections or calls between a respective first terminal and a respective second terminal are being routed through one or more access servers which may be part of the first or second communication network. The invention can be used in all kinds of packet switched networks (not only in IP-based networks; IP: internet protocol).

In particular the invention relates to terminating calls or connections from a packet switch network to a terminal of a circuit switched network through one or more access servers. For example, the invention relates to a situation where speech (e.g. voice over IP) and data calls terminating from a TCP/IP based network (e.g. Internet) are routed to a subscriber (or respectively to his/her terminal equipment) in a telecommunication network. The telecommunication network may be a public land mobile network PLMN, a public switched telephone network PSTN or an integrated services digital network ISDN. All such telecommunication networks are intrinsically based on circuit switching rather than a packet switching.

1. Background of the Invention

An access server is a well-known functionality in TCP/IP and/or telecommunication networks. FIG. 4a shows a number of terminals TE1–TE4 connected to an internet/intranet. In this case an access server AS provides the functionality to enable direct internet/intranet access. As shown in FIG. 4b, the access server AS may also provide an interface between the packet switched network (e.g. a TCP/IP network) and a circuit switched network (such as a public switched telephone network PSTN). It should be noted in FIG. 4b that geographically the entities of the packet switched network and the circuit switched network will overlap. Therefore, the access server AS provides the functional interconnection between entities in the two networks rather than the geographical interface. It is also not important to which network (packet switched or circuit switched network) the access server AS is attributed as long as it provides the functional interconnection between the first and second network, in the case of an interconnection between a packet switched network and a circuit switched network in particular the mapping of a packet switched call from a terminal TE of the first network to a circuit switched call to be terminated in the terminal MS of the second network.

In case the second network is constituted by a mobile radio communication network (such as the D1, D2 or E-plus network in Germany), there may be provided several access servers AS and furthermore the mobile stations MS constituting the second terminals of the second network are mobile, i.e. they roam from cell to cell in the mobile radio communication network.

TELNET Session According to the Prior Art

When a plurality of access servers AS including one gateway access server GAS are provided, one access server AS is used as the final device for the packet switching of the call and the access server AS then converts the packet switched (call) connection to a circuit switched connection (call) between the access server AS and the terminal of the circuit switched network. This may for example be the case, when a mobile station MS is not connected with an IP address (otherwise packet switching may be used end-to-end). FIG. 4c shows steps ①–③ to set up a (call) connection from a terminal TE of a TCP/IP network to a terminal MS of a telecommunication network. In FIG. 4c only for illustration purposes the access servers AS1, AS2 are located in the telecommunication network.

The TELNET session is just an example of how such a (call) connection setup can be done. It is also possible to provide a special translation (address translation) even for a telecommunication network that converts from IP address to MSISDN number, e.g. in cases where subscribers have fixed IP addresses.

In step ① a call from a terminal of the TCP/IP network can be terminated into the telecommunication network. When sending a call set up message (actually this is the first packet transmitted), the terminal TE also includes an identification of the called mobile station MS to which a call is to be set up. The TELNET session is used to retrieve the IP address (either a fixed IP address or a dynamically allocated IP address when the mobile subscriber accesses the TCP/IP network) by sending as identification for the called mobile station the mobile station subscriber number MSISDN in step ② to the access server AS1 or AS2 depending on which access server is provided for serving the mobile station MS. (Moreover, instead of the MSISDN also the IMSI may be used (in mobile radio networks); even more generally E.164 numbers are used such that the concept is generally applicable to PSTN and ISDN as well). In step ③ the access server, e.g. AS1, returns the IP address of the mobile station MS. Of course, it will be appreciated that the mobile station MS roams in said telecommunication network such that depending on the location it will be served by a mobile switching center MSC1 or a mobile switching center MSC2 as illustrated in FIG. 4c.

Whilst the TELNET session can in principle return the IP address of the mobile station, there are some intrinsic problems with the TELNET session.

Firstly, there may be a case where the call set up message is sent to an access server AS which is currently in fact not serving the desired mobile subscriber MS, i.e. the mobile subscriber is not served by the corresponding access server, e.g. AS1, but served by another access server AS2 in the same telecommunication network. Since the call set up message was directed to the access server AS not serving the mobile station MS, no terminating call session can successfully be established. In FIG. 4c it may be noted that a direct call from AS1 to MS only takes place when the MS is really connected to the AS (with an IP address). Usually, the call connection passes through MSC1 (circuit switched).

Secondly, as is also indicated in FIG. 4c, when there are several access server AS1, AS2 in the same telecommunication network (which seems to be very likely due to the growing amount of internet calls), the packet switched call from the packet switched network (internet) will be converted into the circuit switched call in the corresponding "called" or "addressed" access server. Although it may be possible to set up the call if the access server happened to be selected which is currently serving the mobile station, another disadvantage may occur. Namely, the "called" or "addressed" access server may not necessarily be the access server which is located most closely to the mobile station when it roams in the mobile radio communication network.

This means, that in fact there may be another access server located closer to the present location of the mobile station MS which is however not used since the connection is always built up through the "called" access server. The result is that the distance over which the call is handled as a circuit switched call is much longer than necessary. The above example describes the case that the mobile station is not served by an access server because there is as yet no circuit switched connection of a previously setup call connection. That is, in a case where there exists already one circuit switched connection between one access server AS and the mobile station and a further connection is to be setup, then the access server AS should be selected which is already used for the existing circuit-switched connection.

Thirdly, packet switched calls such as calls from the internet may use a plurality of functionalities (such as bearer services) which may not necessarily be supported by all access servers AS in the telecommunication network. In such case a "called" access server AS can not provide the functionalities necessary for the processing of the call from the packet switched network and thus the (call) connection set up will fail.

Fourthly, in particular when the second communication network is a mobile radio communication network, there is no flexible change of the used access server AS in particular when the mobile station roams during an ongoing call. That is, despite there might occur a situation in an ongoing call that another access server AS has a much closer distance to the new location of the mobile station, this access server is never used since only the "called" access server is capable of communicating with the mobile station MS.

SUMMARY OF THE INVENTION

As was explained with reference to the above FIGS. 4a, 4b, 4c there are several disadvantages when setting up (call) connections between a first and second telecommunication network in the prior art, in particular when the first communication network is a packet switched network and the second communication network is a circuit switched network. In particular, there is an inefficient use of the resources of the first and second communication network, since despite the provision of several access servers AS either the inappropriate access server is used or the complete call set up will fail since a wrong access node is called, i.e. an access node which can not provide the call processing funcitonalities needed for supporting the desired call.

Therefore, the object of the present invention is
to provide a method and a communication system where an efficient use of the resources of the first and second communication network is made when setting up a (call) connection between a first terminal of the first communication network and a second terminal of the second communication network.

This object is solved by a method for setting up connections from a first terminal of a first communication network to a second terminal of a second communication network, said connections being routed from said first terminal through one or more access servers to said second terminal, comprising the following steps:
  a) sending a connection setup message from said first terminal to a first access server;
  b) selecting a second access server from an access server identification means on the basis of a location of said second terminal in said second communication network and/or call processing specific characteristics indicating a specific type of call processing of the call in said first and/or second communication network; and
  c) routing said connection setup message to said selected access server and setting up the connection from said first to said second terminal through said selected access server.

The object is also solved by a method for setting up connections from a first terminal of a first communication network to a second terminal of a second communication network, the connections being routed from the first terminal through one or more access servers to the second terminal, comprising the following steps:
  a) sending a connection setup message from the first terminal to a first access server;
  b) selecting a second access server from an access server identification means on the basis of a location of the second terminal in the second communication network and/or call processing specific characteristics (indicating a specific type of call processing of the call in the first and/or second communication; and
  c) routing said connection setup message (to said selected second access server and setting up the connection from the first to the second terminal through said selected second access server; and
a method according to claim 1,
wherein the first communication network (TCP/IP) is a packet switched network (TCP/IP) and the second communication network (PLMN) is a circuit switched network (PLMN); and
a method according to claim 2,
wherein the circuit switched network is a mobile communication network, wherein said access server identification means is stored in the home location register; and
a method according to claim 3,
wherein said home location register stores a table indicating an access server address with respect to each mobile switching center, wherein said first access server provides information about the second terminal to said home location register which in turn determines the mobile switching center currently serving the second terminal on the basis of this information and reads out an appropriate access server address from the table stored in said home location register dependent on the determined serving mobile switching center.

The object is also solved by a method for setting up connections from a first terminal of a first communication network to a second terminal of a second communication network, the connections being routed from the first terminal through one or more access servers to the second terminal, comprising the following steps:
  a) sending a connection setup message from the first terminal to a first access server;
  b) selecting a second access server from an access server identification means on the basis of a location of the second terminal in the second communication network and/or call processing specific characteristics indicating a specific type of call processing of the call in the first and/or second communication network; and
  c) routing said connection setup message to said selected second access server and setting up the connection from the first to the second terminal through said selected second access server; and
a method according to claim 1,
further comprising the following steps:
  s1) sending a connection setup message containing an IP address or a mobile subscriber number from the first terminal to said first access server;

s2) extracting the mobile subscriber number on the basis of the connection setup message in the first access server and sending a send routing information message to a home location register of a mobile radio communication network;

s3) sending a provide roaming number message from said home location register to the currently serving the second terminal;

s4) reserving the mobile subscriber roaming number in said mobile switching center and returning the mobile station roaming number to said home location register in a provide roaming number result message;

s5) determining on the basis of the mobile station roaming number the access server address stored in the access server identification means and sending a send routing information result message to the first access server containing the mobile station roaming number and said selected access server address;

s6) sending data packets from said first access server to the second access server identified by said access server address; and s7) sending an initial address message to the mobile switching center in order to build up a circuit switched connection between said mobile switching center and the second terminal.

The object is also solved by a method for setting up connections from a first terminal of a first communication network to a second terminal of a second communication network, the connections being routed from the first terminal through one or more access servers to the second terminal, comprising the following steps:

a) sending a connection setup message from the first terminal to a first access server;

b) selecting a second access server from an access server identification means on the basis of a location of the second terminal in the second communication network and/or call processing specific characteristics indicating a specific type of call processing of the call in the first and/or second communication network; and c) routing said connection setup message to said selected second access server and setting up the connection from the first to the second terminal through said selected second access server; and a method according to claim 1, further comprising the following steps:

s1) sending a connection setup message containing an IP address or a mobile subscriber number from the first terminal to said first access server;

s2) extracting the mobile subscriber number on the basis of the connection setup message in the first access server and sending a send routing information message to a home location register of a mobile radio communication network;

s3) sending a provide roaming number message from said home location register to the MSC/VLR currently serving the second terminal;

s4) reserving the mobile subscriber roaming number in said mobile switching center and returning the mobile station roaming number to said home location register in a provide roaming number result message;

s5) returning the send routing information result message to the first access server and determining the second access server address on the basis of the call processing specific characteristics as indicated by the access server identification means;

s6) sending data packets from said first access server to said determined second access server as identified by said access server address; and s7) sending an initial address message to the mobile switching center in order to build up a circuit switched connection between the mobile switching center and the second terminal.

Furthermore, this object is solved by a communication system including at least one first communication network having a number of first terminals connected thereto and at least one second communication network having a number of second terminals connected thereto, connections between a respective first terminal and a respective second terminal being routed through one or more access servers, comprising:

a) an access server identification means storing a correspondence relationship between access server identifications and a location of second terminals in said second communication network and/or call processing specific characteristics indicating a specific type of call processing of the call in said first and/or second communication network;

b) selection means for selecting an access server from said access server identification means on the basis of a location of said second terminal in said second communication network and/or call processing specific characteristics;

c) routing means for routing a connection setup message sent from a first terminal to an access server selected by said selection means; and d) setting up means for setting up the connection from said first to said second terminal through said selected access server.

Furthermore the object is solved by an apparatus for selecting an access server in a communication system including at least one first communication network having a number of first terminals connected thereto and at least one second communication network having a number of second terminals connected thereto, connections between a respective first terminal and a respective second terminal being routed at least through said selected access servers, comprising:

a) an access server identification means storing a correspondence relationship between access server identifications and a location of second terminals in said second communication network and/or call processing specific characteristics indicating a specific type of call processing of the connection in said first and/or second communication network;

b) selection means for selecting an access server from said access server identification means on the basis of a location of said second terminal in said second communication network and/or call processing specific characteristics.

Essentially, according to one aspect of the invention, information stored in an access server identification means is used in order to determine the most appropriate access server corresponding to the actual location of the second terminal (subscriber). An access server is selected from this access server identification means on the basis of the location of the second subscriber and/or specific call processing characteristics indicating a specific type of call processing needed by the call in the first and/or second communication network. When the most preferable access server has been selected, the packets from the transmitting subscriber station are then routed to this selected access server and a call communication takes place through this access server (and a respective MSC).

There are two possibilities how the packets can be rerouted to the selected access server AS. One example is where all packets are rerouted from the gateway access server GAS to the selected access server AS (preferably through a tunnel, e.g. by using the L2TP protocol (layer 2 tunneling protocol)). Another example is where the gateway access server GAS sends the IP address of the selected access server AS to the terminal TE in some kind of "change" message, whereafter the terminal TE directly sends the packets to the selected AS (i.e. not through the intermediary of the gateway access server GAS).

Further advantageous embodiments and improvements of the invention are listed in the dependent claims. Hereinafter, embodiments of the invention will be described with reference to the attached drawings. In these drawings, the same or similar reference numerals designate the same or similar parts throughout.

BRIEF DESCRIPTION OF THE DRAWINGS

FIG. 1a shows a communication system SYS according to the invention, in particular an access server identification means AS-IM used for determining an appropriate access server AS;

FIG. 2b shows individual steps S1–S7 used in FIG. 2a;

FIG. 3b shows steps S1–S4, S5', S6, S7 used in FIG. 3a;

Hereinafter, the principle of the invention will be described with reference to a plurality of embodiments.

PRINCIPLE OF THE INVENTION

FIG. 1a shows a principle block diagramm of a communication system SYS according to the invention. The communication system SYS includes at least one first communication network TCP/IP, for example a packet switched network, having a number of first terminals TE, TE1, TE2 connected thereto. The communication system SYS includes at least one second communication network, for example a circuit switched telecommunication network PLMN, PSTN, ISDN having a number of second terminals MS connected thereto. In case the second telecommunication network is a mobile radio communication network, said second terminals MS are mobile stations of the mobile radio communication network. Furthermore, FIG. 1a shows a plurality of access servers AS1, AS, AS2 and one gateway access server GAS.

Figure 4A:
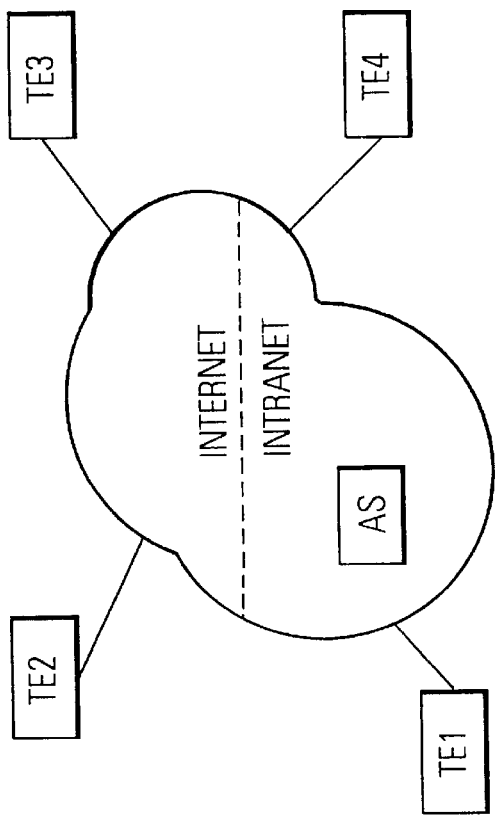
FIG. 4a shows a diagram where an access server AS is providing an access for an internet/intranet configuration.
Figure 4B:
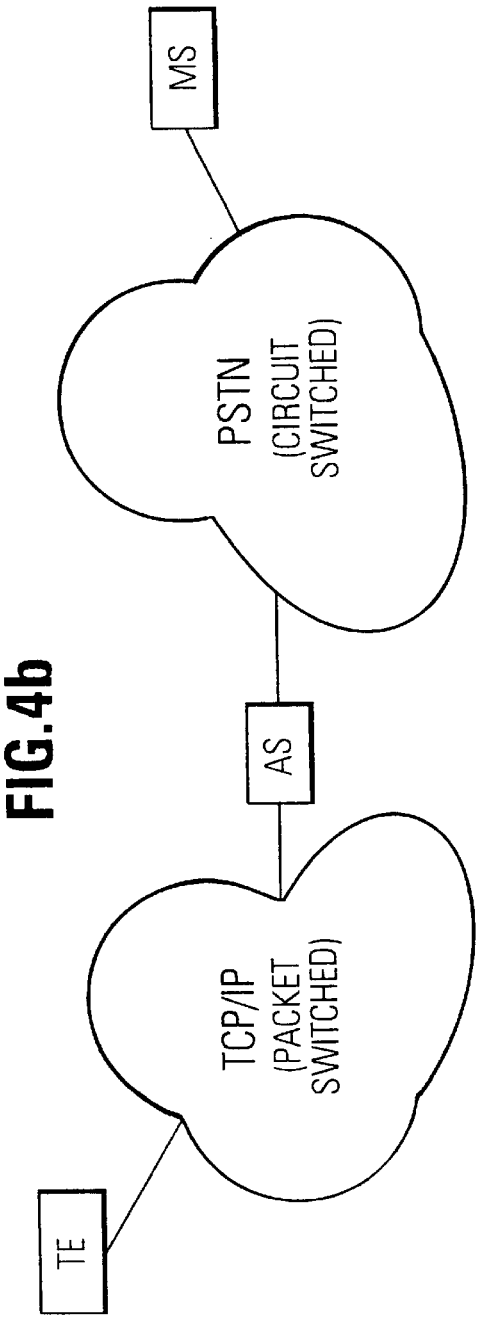
FIG. 4b shows the functional interconnection of a packet switched network and a circuit switched network through an access server AS according to the prior art.
Figure 4C:
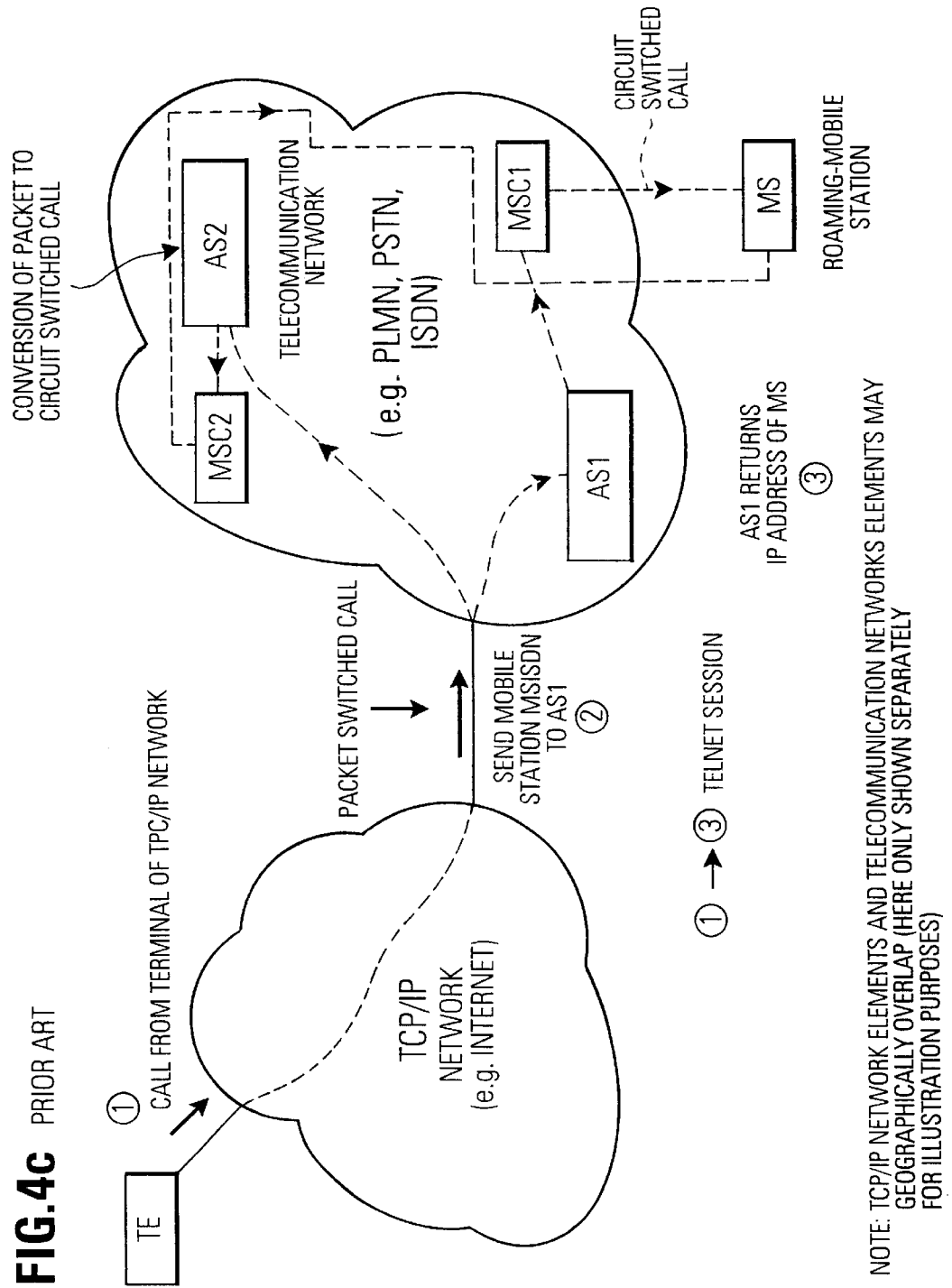
FIG. 4c shows the routing of a packet switched call to an access server AS1 according to a prior art.

Furthermore, two mobile switching centers MSC1, MSC2 for the case of a PLMN are illustrated. In analogy to FIG. 4c it should be understood that FIG. 1a only shows the functional overview of the interaction of the two communication networks, whilst geographically they may overlap. Although FIG. 1a shows the addition of an additional gateway access server GAS, it may be noted that also every other access server AS1, AS may serve as a gateway access server.

In FIG. 1a an access server identification means AS-IM is provided. This access server identification means AS-IM stores a correspondence relationship between access server identifications AS-ADR (in the simplest case an access server address, e.g. an IP address) and a location LA (i.e. the roaming MSC) of second terminals MS in said second communication network PLMN and/or call processings specific characteristics CPCs. As is indicated in FIG. 1a, there may be used a correspondence relationship between the access server identification and only the location of the second terminals (or the MSC currently serving the respective second terminal), for example LA(MSC)⇆AS. Alternatively, there may be used a correspondence relationship between an access server identification AS2 and only a call processing specific characteristic CPC2. In the most general case, the used correspondence relationship relates to a combination of the location LA and the call processing specific characteristics CPC and the access server identification as illustrated for the relationship LA1/CPC1⇆AS1.

The access server identification means AS-IM may for example be a table provided in a memory of a home location register HLR, said table indicating a correspondence relationship between "nearest access server" and "roaming MSC" (since the roaming MSC is anyway stored in the home location register HLR).

Furthermore, FIG. 1a shows a selection means SEL for selecting an access server from the access server identification means on the basis of a location LA of the second terminal in said second communication network and/or call processing specific characteristics. The selection means SEL may be a part of the gateway access server GAS or not. For explanation purposes the selection means SEL in FIG. 1a is shown as being part of the gateway access server GAS. A routing means for routing a call setup message (in fact, in a packet switched connection there is as such no set-up-message; instead the first arriving packet(s) will contain the information to which second terminal the succeeding packets are to be routed; furthermore, in the packet switched environment it is not really the message to setup the call, but the message to setup a specific "connection" since the call actually comprises single packets which arrive serially over time; however, in the present description the term "call setup message" if used is to designate this information contained in a packet indicating the desired second subscriber to which a connection (packet switched and circuit switched) is to be setup) received from a first terminal TE to an access server AS as selected by said selection means as well as a setting up means for setting up the (call) connection from said first to said second terminal through said selected access server AS may be provided by the gateway access server GAS or the access server AS. As is illustrated in FIG. 1a, a call from the terminal TE to the terminal MS is routed through the gateway access server GAS and a specially selected access server AS. As also explained above, in special circumstances the packets may also be routed directly to the selected access server AS.

Figure 1B:
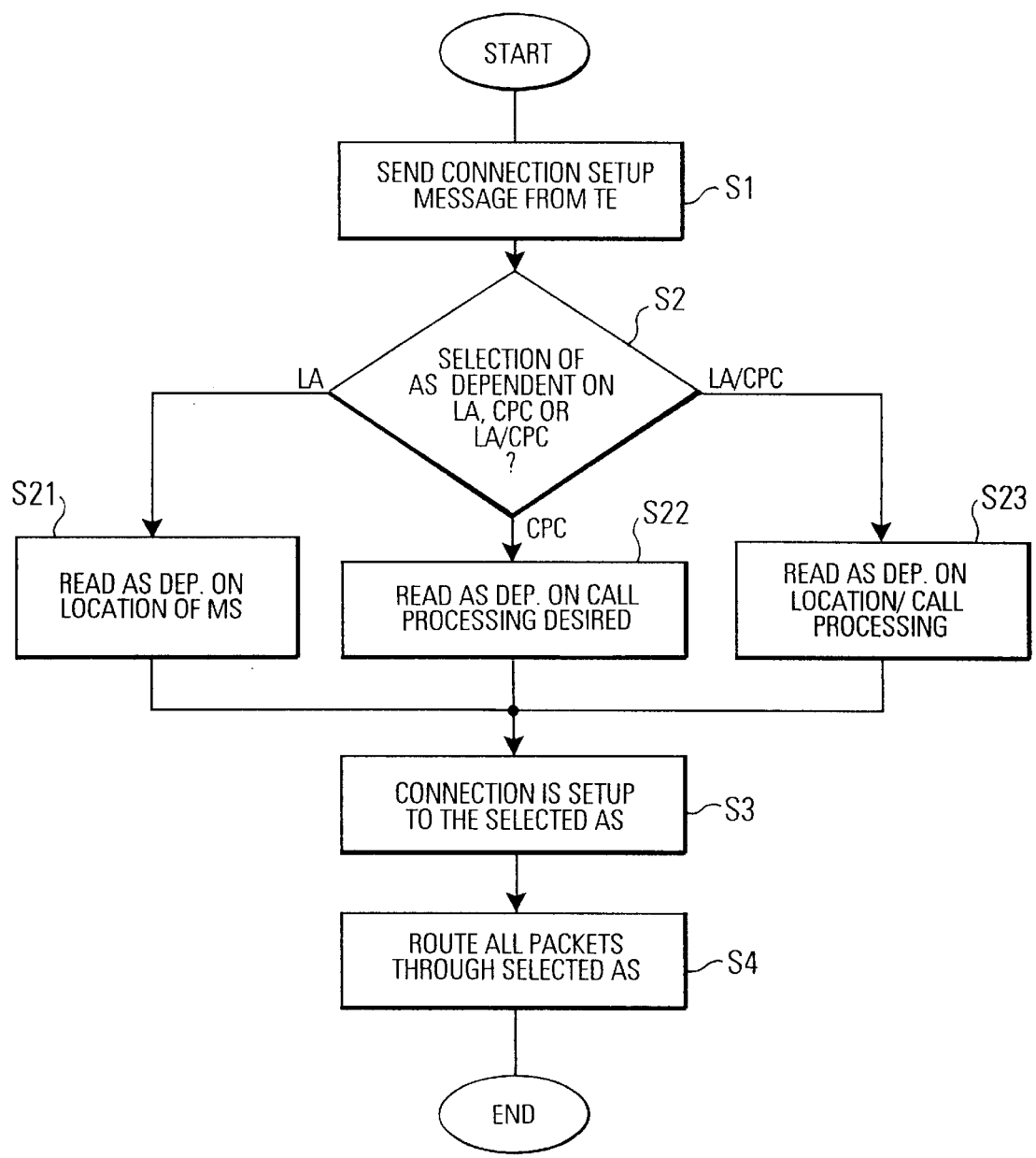
FIG. 1b an embodiment of the method for setting up calls between terminals of a first and second communication network as shown in FIG. 1a according to the invention.

FIG. 1b shows a method for setting up (calls) connections from the first terminal TE of the first communication network TCP/IP to a second terminal MS of the second communication network, wherein the calls are routed from the first terminal TE through one or more access servers AS to the second terminal MS. In step S1 a call setup message SET is sent from the first terminal TE to a "called" access server as in the case of the TELNET session. The "called" access server is referred to as gateway access server GAS. In step S2 it is determined, whether the access server determination shall be dependent on the location LA of the second terminal MS, dependent on call processing specific characteristics CPC or on a combination of the location and call processing specific characteristics LA/CPC.

If step S2 indicates that only the location LA shall be used for determining the appropriate access server AS, then step S21 reads out an access server identification AS-ADR dependent on the location of the mobile station MS. In this case the access server identification means AS-IM only contains indications of access servers for the present location LA of the mobile station MS. In step 21 during the call setup, the selection means SEL reads a specific access server identification AS-ADR according to the location LA of the mobile station. In this case the following Table 1 illustrates possible contents of the access server identification means AS-IM.

TABLE 1

| Location LA of Mobile Station MS | Address of Appropriate Access Server AS |
|---|---|
| MSC1 (= roaming MSC) | AS1 |
| MSC2 | AS1 |
| . | AS4 |
| . | . |
| MSCn | ASm |

In the above Table 1, it will be appreciated that "MSCn" is an indication of the location LA of the mobile station MS. As seen in Table 1, the information about the location is not directly an indication of a cell, but rather an indication of a roaming MSC, since an access server is connected to an MSC. When the Table 1 is provided in the HLR, the information regarding the roaming MSC is directly available in the HLR. If it is provided in the GAS, the information in HLR about the MSC in which the mobile station is currently roaming is transferred by means of a MSRN (Mobile Station Roaming Number, which consists of one part relating to the enduser and another part relating to the roaming MSC) from HLR to the gateway MSC (GMSC) in a SRI result message (SRI: Send Routing Information). The part of MSRN relating to the roaming MSC is then mapped into the corresponding ("nearest") access server AS by the GAS holding the Table 1 relationship.

In case of a public land mobile network PLMN, the correspondence relationship as in Table 1 may thus be established through the determination of which mobile switching center/visitor location register MSC/VLR is currently serving the mobile station MS (as indicated in table 1). Therefore, LA may be seen as representing the currently responsible mobile switching center for serving the mobile station MS. Once the appropriate address of the access server AS-ADR has been read out from the access server identification means AS-IM, the (call) connection setup message (packet) SET is routed to the selected access server AS and the (call) connection from the first to the second terminal is setup through the selected access server AS in steps S3, S4 such that all packets will be routed to this selected AS.

Therefore, in case step S2 determines that the access server selection shall only take place on the basis of the location LA of the mobile station MS, information in the access server identification data base is used in order to determine the most appropriate access server according to the actual location of the subscriber. Preferably, the access server identification means AS-IM may be stored in the "called" access server GAS, where for example the requested bearer services could be checked and the corresponding access server can be selected. Thereafter, the call is then routed via the TCP/IP network to this most appropriate access server.

In case the second communication network of the communication system SYS is a mobile radio communication network, the information data base (the access server identification means) may preferably be stored in the home location register HLR of the PLMN. As explained above, in order to locate the nearest access server to the current location of the mobile subscriber, the access server identification means (in fact a Table as is shown in FIG. 1a) in the home location register HLR can store the nearest access server AS with respect to the visited MSC/VLR.

However, independent as to where the access server identification means AS-IM and the selection means SEL are located, the major advantage is achieved, that always the most appropriate access server according to the actual location of the subscriber is used. That is, even if the mobile subscriber has roamed to a different MSC (different mobile switching center), then always the nearest access server can be selected and thus the distance over which the circuit switched nature of the call connection needs to be maintained is held as short as possible. It may also be noted that the MSC to which the mobile station has roamed may be part of a different PLMN, i.e. Table 1 stored in HLR (of the old and/or new PLMN) or GAS can be updated to also contain entries of roaming MSCs of other PLMNs, for example by means of modified location updating procedure information.

This most appropriate access server selection and rerouting will enable telecommunication operators to only reserve some fixed IP addresses in one access server (namely in the gateway access server). These IP addresses are then used for all subscribers in the telecommunication network, since they are only needed to route the call to the access server. This means, that no TELNET session is needed any more and that thus the circuit switched part of the call is as short as possible. On the other hand, it will still be necessary to transfer (in a first packet) the above-mentioned E.164 number of the desired (terminating) second subscriber station.

A particularly advantageous example of the usage of this rerouting mechanism is for the case of General Package Radio System GPRS when the terminating network does not (fully) support GPRS and a conversion from a packet switched to a circuit switched call is required (again keeping the actual circuit switched part as short as possible).

As will be explained below, the selection of the appropriate access server AS can also be combined with other selection criteria like the call processing specific characteristics (CPCs) which indicate a specific type of call processing of the call. For example, the required bearer service (e.g. real-time requirements in case of voice over IP) can be checked and considered for the routing to an appropriate access server, as will be further explained below with reference to step S23 in FIG. 1b.

Before coming to a further discussion of steps S22, S23 it should further be noted, that the routing of the call and the selection of an access server AS depending on the location LA of the mobile station MS in the Public Land Mobile Radio Communication Network PLMN can also be made dynamically during an ongoing call. That is, during an ongoing call the mobile station may roam over a considerable distance, i.e. it may for example traverse several cells until it is serviced by a mobile switching center MSC far away from the original one that was used when the call was first setup to the mobile station MS. In such a case, it may happen that the roamed mobile station MS is after some time and distance much closer to another access server AS such that during the ongoing conversation/data call the "next" or "new" access server AS would actually now be the more appropriate access server to be selected. Therefore, the selection means SEL performs preferably a continuous supervision of the location LA of the mobile station MS and routes the call connection even during an ongoing call to a new access server AS by continuously monitoring the location LA of the mobile station MS with respect to the most appropriate access server AS as is indicated by the entries in the access server identification means shown in Table 1. Thus, a switching to the most appropriate access server AS may even take place during the ongoing call. Thus, the distance over which a circuit switched nature must be maintained is made as short as possible at all times.

As explained above, one possibility is that the selection of the appropriate access server AS is entirely based on the actual location of the mobile station MS during a connection setup or during an ongoing call. Hereinafter, another possibility for the selection of the appropriate access server AS is described with reference to step S22 in FIG. 1b.

As is indicated with step S22 in FIG. 1b, if the selection determined in step S2 is to be made entirely on the basis of call processing specific characteristics, the access server identification means AS-IM generally shown in FIG. 1a contains different entries in the first column. The selection criteria relating to call processing specific characteristics CPCs indicate a specific type of call processing desired for the call in the first and/or second communication network. For example, as is well known, in the connection setup message a specific protocol may be requested, for example real-time protocols for voice over IP or video applications etc. In this case, only some of the access servers AS, AS1, AS2 shown in FIG. 1a may support a particular bearer service needed for this requested protocol and therefore the selection of an appropriate access server AS may be made dependent on the specific call processing, i.e. a protocol needing specific bearer services, supported by a specific access server AS.

That is, any access server can have specific bearer services and/or can support specific protocols and/or can have specific hardware, i.e. one or more modems (modem pool) for specific interconnection tasks in case of interworking with an analogue network. Thus, in most cases not only the bearer service but also specific protocols like IPSEC (security), RTP (Real Time Protocol) or RSVP (Resource Reservation Protocol) may be used for the call processing specific characteristics selection. It is thus also possible to combine the protocol and/or the bearer service and/or the hardware for the AS selection. The following Table 2 shows entries of an access server identification means AS-IM for the case of selecting an appropriate access server (address) based upon call-processing specific characteristics CPCs exclusively.

TABLE 2

| Call Processing Specific Characteristics CPCs | Access Server Address |
| --- | --- |
| CPC 1.1: Congestion in the "called" Access Server | AS1 |

TABLE 2-continued

| Call Processing Specific Characteristics CPCs | Access Server Address |
| --- | --- |
| CPC 1.2: Distribution of load in the access servers | AS1 |
| CPC 2.1: BS1 (bearer service) | AS1 |
| CPC 2.2: BS2 | . |
| . | . |
| . | . |
| . | . |
| CPC 2.n: BSn | ASm |
| CPC 3.1: Voice over IP-gateway | AS3 |
| CPC 3.2: USSD-gateway | AS1 |
| CPC 4.1: Monitoring equipment | AS4 |
| CPC 4.2: ATM switch | AS5 |
| CPC 4.3: Modems | AS3 |
| CPC 5.1: L2TP | AS1 |
| CPC 5.2: BAP/BACP | AS6 |
| CPC 5.3: MLP | AS6 |
| CPC 6.1: RSVP | ASm |
| CPC 6.2: RTP | AS1 |
| CPC 6.3: SIP (Session Initiation Protocol) | AS2 |

As can be seen from Table 2 above, the call processing specific characteristics CPC1–CPC6 (note that there are always contained in the first IP packet sent by the first terminal) indicate a specific type of call processing of the call in the second communication network (or if the access server functionality is attributed to the first communication network, also in the first communication network).

Specifically, the CPC1.1 indicate a rerouting to another access server in case of a congestion in a "called" or "currently used" access server. The CPC 1.2 indicate a specific load distribution in the access servers. For example, if the load distribution is such that AS3 has 50% load, AS2 has 30% load and AS1 has 20% of load in a distribution, then it may be desired that AS1 is used for such a load distribution. That is, the selection means could inquire all access servers about their present load and the Table 2 will indicate the access server which has a predetermined or lowest load. If other selection criteria are used in combination therewith (for example the "nearest access server"), then e.g. the nearest access server having a predetermined or lowest load can be defined and selected. The load may concern the overall load at an access server or the specific load relating to one or more call processing specific features CPC1–6, e.g. the load on the modems (CPC 4.3) or the monitoring equipment (CPC4.1).

The CPC2 indicate the selection of an access server AS dependent on the required/preferred bearer services as requested in the (call) connection setup message. Different bearer services may for example be real-time protocols for voice over IP or video applications. The CPC3 indicate a specific gateway functionality required by the desired call. Such CPC3 gateway functionality may for example be voice over IP gateway or USSD gateway etc. Furthermore, CPC4 indicate specific hardware needed in the access server AS, for example a monitoring equipment or an ATM switch. Furthermore, CPC5 indicate specific data link layer protocols required in order to achieve a certain functionality, such as L2TP (Layer 2 Tunneling Protocol), BAP/BACP (Bandwidth Allocation (Control) Protocol) and MLP (Multi Link Protocol). The CPC6 indicate specific protocolls required in order to achieve a certain functionality such as RSVP (Resource Reservation Protocol) or RTP (Real Time Protocol) or SIP (Session Initiation Protocol). Finally, although not shown in Table 2, the selection may also be based on specific AS of the ISP (Internet Service Provider)

used and dedicated for said desired (terminating) second terminal. That is, if only specific access servers AS are available for a particular second terminal, then this can be indicated in the Table 2 including one particular AS to be used.

Also combinations of the above described call processing specific characteristic CPC1–CPC5 may be used in determining a specific desired access server. Using such combinations of CPSs, the most appropriate type of access server AS for processing the call can be selected. It will also be appreciated, that the entries in Tables 1, 2 can be provided individually for each (registered) second terminal (for example determined by the capabilities of the respective second terminal) or commonly for all second terminals.

As already explained above with respect to step S21, the special selection of an appropriate access server AS in step S22 in accordance with the call processing specific characteristics CPCs may also be performed on-line during an ongoing call. That is, if during an ongoing call the type of functionality needed in the access server AS changes, for example by transferring specific parameters from the first terminal TE, then also during an ongoing call the access server AS may be changed for the new requirements of the call.

The administration of the access server identification means for the determination of the most appropriate access server can be handled depending on the location of the "most appropriate" access server functionality as follows. That is, what is meant with administration is the current updating of the access server identification means AS-IM depending on the location of the "appropriate access server functionality". Assuming that the access server identification means AS-IM is part of the home location register HLR of a Public Land Mobile Radio Communication Network PLMN, an operator management interface either via the MML (man-machine language) commands or a special TCP/IP based interface (for example a SNMP based interface) can be used. It could be any administration interface/protocol.

If the access server identification means AS-IM is located in the gateway access server GAS, then a TCP/IP based interface (for example a SNMP or CORBA based interface) can be used. Although it has been described above that the access server identification means AS-IM is preferably only provided once in the second network PLMN or is possibly located in the HLR or the GAS, it should be noted that also several different access servers AS, AS1, AS2 may contain such an access server identification means AS-IM, such that any such access server AS may be initially "called" and immediately the most appropriate access server AS can be determined.

Therefore, the configuration in FIG. 1a should not be seen as limiting for the invention, since it is only essential that the communication system SYS contains somewhere at least once an access server identification means AS-IM, a selection means SEL as well as a routing and setting up means.

Whilst in the above steps S21, S22 in FIG. 1b it was described separately that the access server selection takes place on the basis of the location LA or the call processing specific characteristics CPCs, it is of course possible to combine the location selection with the call processing specific selection as done in step S23 if in step S2 such a selection is determined.

That is, although not necessarily the closest access server AS is selected, it can still be ensured that the closest access server AS which simultaneously fulfills certain call processing requirements will be selected. FIG. 1a already shows schematically some combination of locations and call processing specific characteristics which result from a combination of entries in Table 1, Table 2, explained above. Specifically, the following Table 3 shows an example of a table which is referred to in step S23 on the basis of a specific location as well as on the basis of a specific called processing requirement.

TABLE 3

| Location/Call Processing Specific Characteristics | Access Server Address (e.g. IP address) |
| --- | --- |
| MSC1/BS1 | AS1 |
| MSC2/BS2 | AS2 |
| MSC3/BS1 | AS3 |
| MSC3/BS4 | AS4 |
| . | . |
| . | . |
| . | . |
| MSCn/BSm | ASm |

The above Table 3 shows a combination of LA/CPCs for the case of selecting a specific bearer service in the access server AS. A skilled person derives other combinations of LA/CPC from the entries in Table 1/Table 2 discussed above.

In step S3 the connection for the packets is setup to the selected access server and in step S4 all packets are then forwarded to the selected access server during the ongoing call.

Furthermore it should be noted, that the apparatus, the communication system and the method to the invention can also be provided to select a sequence of access servers AS in a priority order depending on the location of the second terminal and/or on the call processing specific charcteristics (i.e. items from Tables 1–3). That is, for example, in a case where the nearest access server AS is in a high load condition, the selection can be performed such that the next priority of selection is the selection of an access server which is not as close as the one in high load condition, but supports certain other call processing related features (e.g. a particular modem) and is in a low load condition. Thus a predetermined sequence of attempts can be performed until a suitable access server is selected.

"Nearest" Access Server in a PLMN

Figure 2A:
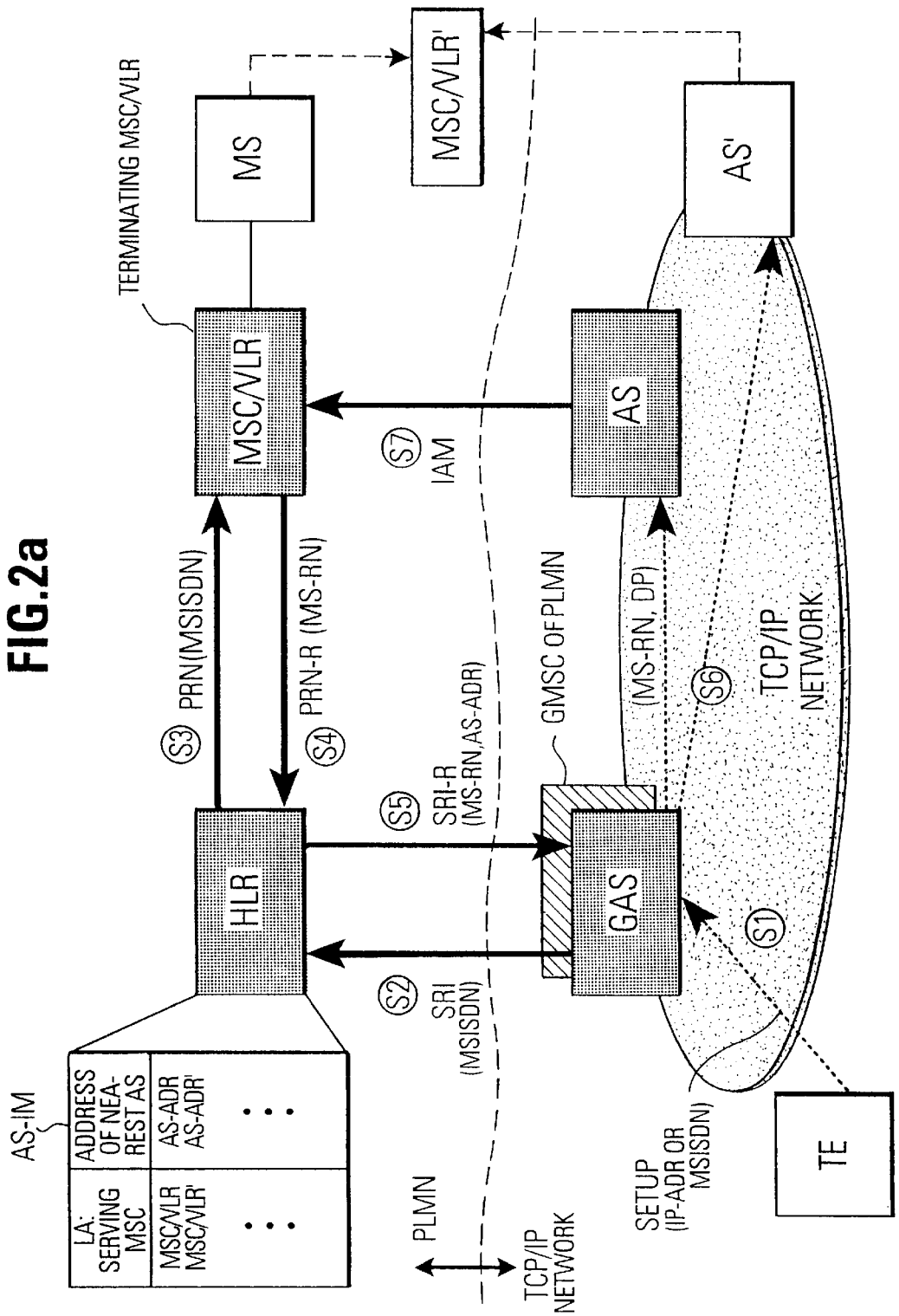
FIG. 2a shows an embodiment of the method of the invention for selecting an access server AS located closest to the mobile switching center/visitor location register MSC/VLR which is currently serving the mobile station MS.

FIG. 2 shows an embodiment of the communication system SYS according to the invention for the case of selecting a nearest access server in a mobile radio communication network. FIG. 2b shows a flow chart for the individual steps as indicated in FIG. 2a. In FIG. 2a it is assumed that the access server identification means AS-IM generally shown in FIG. 1a is located in the Home Location Register HLR and contains entries as generally indicated in Table 1 discussed above. MSC/VLR in FIG. 2a denotes the mobile switching center/visitor location register currently serving the mobile station MS to which a call connection should be set up. Furthermore, AS' denotes a further access server and MSC/VLR' denotes a further mobile switching center/visitor location register of the PLMN. Only for a functional interpretation a dotted line separates the functionalities of the PLMN and the TCP/IP network. The gateway access server GAS which receives the setup message (packet) from the first terminal TE may either be an access server with an interface to the GMSC (gateway mobile switching center) in the PLMN (for example with a primary rate access interface) or in fact a combined GMSC/AS node.

Furthermore, it should be noted in FIG. 2a that the GAS/AS is functionally attributed to the packet switched network, however, it may also functionally be attributed to the PLMN, since the GAS and the AS intrinsically perform an interface function such that it is irrelevant to which of the communication networks they are attributed.

In step S1 the first terminal TE of the packet switched network issues a call setup request packet SETUP which is received in the gateway access server GAS of the TCP/IP network. Of course, when performing a routing through a packet switched network, there is no real call setup message as explained before, however a first packet (or packets) indicates to the GAS (or AS) at least the request that the packets be routed to a particular second terminal. Thus, the packets transferring the SETUP information contain either the mobile subscriber number MSISDN or the IP address IP-ADR of-the mobile subscriber (generally as explained above the E.164 number). Furthermore, of course, if the selection is to be made on the basis of the bearer service as needed by the requested protocol or in combination with the bearer service (or other call processing related features) the setup information will also contain such selection information. In the gateway access server GAS the subscriber number MSISDN of the mobile subscriber is determined. If the setup information SETUP already contains this mobile subscriber number MSISDN, the gateway access server merely strips off this subscriber number MSISDN from the received TCP/IP packet. If the setup information SETUP contains the IP address IP-ADR of the mobile subscriber, then the gateway access server GAS (possibly via an external server) converts the IP address IP-ADR into the mobile subscriber number MSISDN. The GMSC functionality in the gateway access server GAS (if they are a combined node) or in a separate GMSC device is then invoked with the determined subscriber number MSISDN.

Once the GMSC functionality is invoked, routing information is requested from the home location register HLR by sending a routing information request message SRI (MSISDN) (SRI: Send Routing Information) to the home location register HLR from the invoked GMSC functionality.

In step S3 a roaming number provision request message PRN (MSISDN) is sent from the HLR to determine the MSC/VLR currently serving the mobile station MS to which the call should be set up. It may be appreciated that there are other mobile switching centers MSC/VLR' present in the PLMN which, however, currently do not serve the mobile station MS since they are responsible for handling traffic in other service areas comprising other cells.

In step S4 the mobile subscriber roaming number MS-RN is reserved in the terminating MSC/VLR and the mobile subscriber roaming number MS-RN is transferred to the HLR in the provide roaming number result message PRN-R in step S4.

In step S5 the appropriate access server address AS-ADR corresponding to the current location, i.e. the current serving MSC/VLR of the mobile subscriber is read out from the corresponding access server identification table AS-IM and is returned to the gateway access server GAS in the send routing information result message SRI-R (MS-RN, AS-ADR). If the AS-IM is located in the gateway access server GAS, then the address of the appropriate access server AS-ADR is determined in the GAS after receiving the message SRI-R. In step S5 the "serving" mobile switching center MSC/VLR can be determined by the HLR on the basis of the returned mobile station roaming number MS-RN. That is, knowing the mobile station roaming number MS-RN a selection means provided in the home location register HLR accesses the first row in AS-IM and reads out the address AS-ADR of the access server AS. This address AS-ADR is then inserted in the SRI-R message. Thus, for the example in FIG. 2a the determination of the mobile station roaming number MS-RN is also essential for determining the currently serving mobile switching center MSC/VLR to determine the appropriate access server identification (address).

After receiving the send routing information result message SRI-R the gateway access server GAS extracts the address of the appropriate access server AS-ADR and detects that among the available access servers AS, AS' it is the access server AS (identified by the address AS-ADR) which should be used for terminating the packet switched call, i.e. to define the termination point where the packet switched call is transferred into the circuit switched call. The IP address and standard IP routing is used to send the packets to this selected access server AS. At this point the gateway access server can assume that the access server AS is the closest access server to the mobile station, since the activated MSC/VLR-AS correspondence relationship in the access server identification table AS-IM always indicates the closest access server AS. If other combinations of selection criteria such as a combination of call processing related criteria with the requirement of "nearest access server" or in fact call processing related criteria alone are used, the GAS knows that the access server AS will fulfill these requirements. Therefore, in step S6 the packets DP including the mobile subscriber roaming number MS-RN are routed via the TCP/IP network to the specific access server AS identified by the address AS-ADR. The routing may be performed through the gateway access server GAS or several intermediate other access servers AS until the final access server AS is reached.

In step S7 the finally selected appropriate access server AS converts the TCP/IP signalling format of the TCP/IP packet switched network to the ISDN signalling (circuit switched call) and because of a InitialAddressMessage IAM to the terminating MSC/VLR where the mobile subscriber roaming number was reserved. Since the access server AS needs to know to which mobile switching center the ISDN signalling should be made, the access server AS must receive the data packets DP as well as the mobile station roaming number MS-RN. After steps S1–S7 data packets of the packet switched call are routed to the access server AS and the data packets are transferred to the mobile switching center/visitor location register MSC/VLR currently serving the mobile station MS as a circuit switched call. Thus, the "nearest access server" selection provides an optimal routing mechanism, since the circuit switched connection distance will be as short as possible.

As explained above, even if the mobile station MS during the ongoing call moves from the cell served by MSC/VLR to a cell served by MSC/VLR', this can be detected since entries in the home location register HLR will be updated, such that the selection means SEL can determine a new access server address AS-ADR' which may be located closer to the MSC/VLR' than the previous access server AS. Therefore, also a concurrent supervision of the locations of the mobile station MS leads to a rerouting of the call to the appropriate nearest access server AS' (as is indicated with the dashed lines between MS, MSC/VLR' and AS' in FIG. 2a).

Required Bearer Services Based Access Server

Figure 3A:
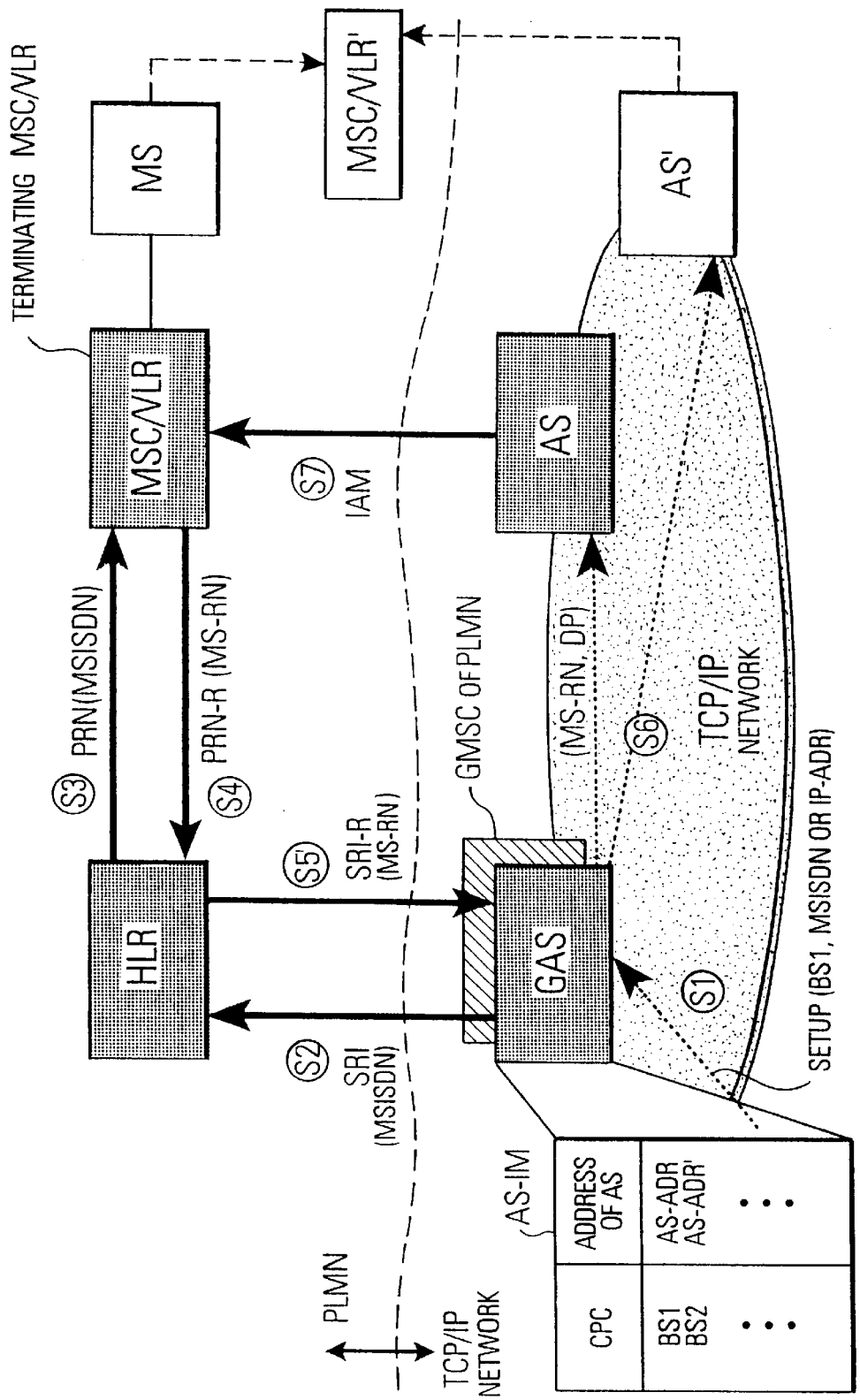
FIG. 3a shows the selection of an access server according to specific call processing characteristic (bearer service)
Figure 3B:
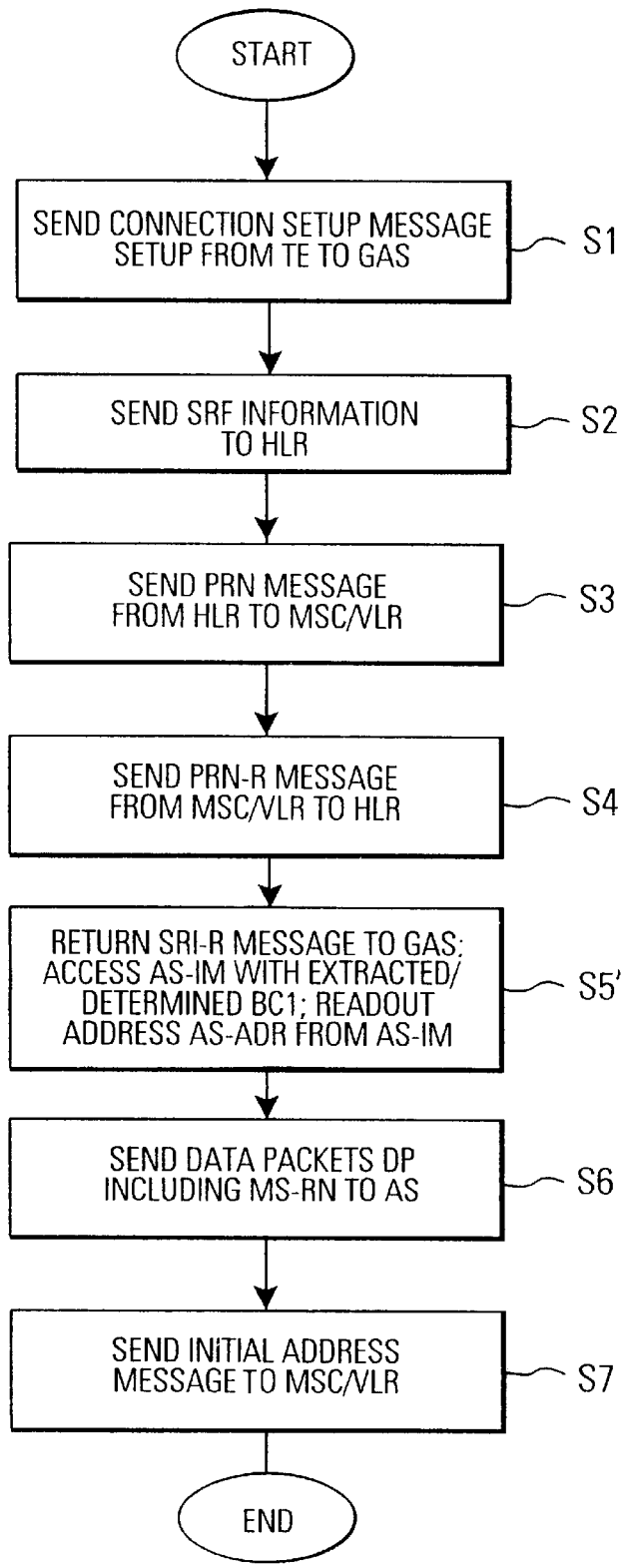

FIGS. 3a, 3b illustrate the case where the access server selection and the appropriate routing is based on the required bearer service BS. The difference to FIG. 2a, 2b is that the access server identification means AS-IM can be provided in the gateway access server GAS and that the call setup information packet SETUP not only contains the MSISDN or the IP-ADR parameter, but also an indication of the requested bearer service, in the case of FIG. 3a the BS1. Such an indication can be the actual information indicating directly the requested bearer service, e.g. added to the MSISDN as shown in FIG. 3a. However, as explained above, normally the information of the needed bearer service is derived from the requested packet switched protocol (e.g. RTP). Thus, actually the protocol selection will indicate implicitly the necessary bearer services.

The steps S1–S4 and steps S6, S7 in FIG. 3 are analogous to the corresponding steps in FIG. 2 with the only difference that in step S1 a different kind of setup information SETUP is received. In step S5' the home location register HLR returns the send routing information result message SRI-R to the gateway access server GAS. In step S5' the SRI-R message only contains the mobile station-roaming number indicating the MSC/VLR currently serving the mobile station MS.

Furthermore, in step S5' the gateway access server GAS selects an access server address based on the higher layer protocol. As is seen in FIG. 3a, the gateway access server GAS may examine a call processing specific characteristic BS1 contained in the setup message and then accesses the access server identification means AS-IM with the determined bearer service indication BS1. The table AS-IM indicates that the access server AS is to be selected since the table AS-IM contains the address AS-ADR for this specific bearer service BC1. Alternatively, if the setup information SETUP does not contain an indication of the bearer service, the gateway access server GAS can examine individual data packets received from the terminal TE in order to automatically determine which kind of bearer service or other call processing features are necessary to process the call. Thus, the bearer service parameter BS1 indicates the higher layer protocols which provide a real-time application support. As explained above, normally the protocol selection will implicitly contain an indication as to which bearer services are necessary.

The gateway access server GAS thus selects a corresponding access server AS which is also equipped with the needed functionality/protocol. The gateway access server GAS takes the address AS/ADR of the appropriate access server and data packets DP including the mobile subscriber roaming number MS-RN are routed via the TCP/IP network (possibly through one ore more data access servers AS) to the specific access server AS which is supporting the respective protocol needed for the requested bearer service.

The other steps S6, S7 are completely equivalent to the corresponding steps in FIG. 2b. Thus, specific call processing features necessary for processing the call are provided by the appropriate access server AS.

LA/CPC Based Selection of the Access Server

It should also be noted that the procedure in FIG. 2 and the procedure in FIG. 3 can be combined, as was already generally discussed with reference to FIG. 1a, 1b. That is, combining the steps S5, S5', a selection of the access server address AS-ADR can also be performed in such a way that not only the appropriate access server AS on the basis of specifically requested call processing features, but also on the basis of the nearest access server AS can be selected. That is, if several access servers AS, AS' both provide the requested functionalities (bearer services), then a further selection can be performed by also including the location aspect in the selection. Therefore, the call processing specific characteristics CPC can be combined with the location characteristics LA for determining the final access server address AS-ADR to which the data packets should be routed before the conversion into the circuit switched call takes place.

INDUSTRIAL APPLICABILITY

As described above, according to the invention packets of a call connection from a first communication network are routed to a specific access server to access functionalities of a different kind of processing in the second communication network. According to the invention a selection of the access server takes place on the basis of the location of the second terminal in the second communication network and/or specific call processing features which may only be supported by specific access servers. Thus, the resources of the second communication network and of the first communication network are optimally used.

It should be noted that the invention is not restricted to the interconnection of a first communication network constituted as a data packet communication network and a second communication network as being constituted by a circuit switched network. The invention is equally well applicable to any communication system containing one or more communication networks independent on the kind of data processing that is carried out in each communication network as long as there is a specific need to select an access server for interconnecting the at least two communication networks. If other types of first and second communication networks are used, it is clear that equivalent messages relating to the above described setup messages (and setup information) and the other messages are found in such other networks, so that the invention is not restricted to the above described best mode of the invention relating to the combination of a packet switched and circuit switched network.

Futhermore, it should be noted that the invention is not restricted to the above described embodiments and that variations and modifications of the invention may be performed by a person skilled in the art on the basis of the above teachings. In particular, it should be noted that the invention can comprise features from individual claims as listed below. Reference numerals in the claims only serve clarification purposes and do not limit the scope of protection.

I claim:

1. A method for setting up connections from a terminal equipment (TE) of a packet-switched communication network to a mobile terminal (MS) of a circuit-switched mobile communication network, the connections being routed from the TE through one or more access servers to the MS, said method comprising the steps of:

a) sending a connection setup message from the TE to a first access server;

b) selecting a second access server from an access server identification means in a some location register (HLR) in the mobile communication network based on a location of the MS in the mobile communication network and/or call processing specific characteristics indicating a specific type of call processing of the call in the packet-switched network and/or the circuit-switched mobile communication network, wherein the access server identification means includes a table indicating an access server address with respect to each mobile switching center (MSC) in the mobile communication network, and wherein the first access server provides information about the MS to the HLR which, in turn, determines the MSC currently serving the MS on the basis of the MS information, and reads out an appropriate access server address from the table in We HLR dependent on the determined serving MSC;

c) routing the connection setup message to the selected second access server; and d) setting up the connection from the TE to the MS through the selected second access server.

2. A method for setting up connections from a terminal equipment (TE) of a first communication network to a mobile terminal (MS) of a mobile communication network, the connections being routed from the TE through one or more access servers to the MS, said method comprising the steps of:

a) sending a connection setup message from the TE to a first access server;

b) selecting a second access server from an access server identification means based on a location of the MS in the mobile communication network and/or call processing specific characteristics indicating a specific type of call processing of the call in the first communication network and/or the mobile communication network, said call processing specific characteristics being selected from a group consisting of:

detection of congestion in a candidate second access server;

distribution of traffic load in the candidate second access servers;

required/preferred bearer services;

required specific gateway functionalities;

required specific hardware in the second access server;

required specific data link protocols; and required specific protocols to obtain special functionalities;

c) routing the connection setup message to the selected second access server; and d) setting up the connection from the TE to the MS through the selected second access server.

3. A method for setting up a connection from a terminal equipment TE) of a first communication network to a mobile terminal (MS) of a mobile communication network, the connection being routed from the TE through one or more access servers to the MS, said method comprising the steps of:

a) sending a connection setup message containing an Internet Protocol (IP) address or a mobile subscriber number from the TE to a first access server;

b) extracting by the first access server, the mobile subscriber number based on the connection setup message;

c) sending to a home location register (HLR) in the mobile communication network, a send routing information message that includes the mobile subscriber number;

d) determining by the HLR based on the mobile subscriber number, a serving mobile switching center (MSC) currently serving the MS;

e) sending a provide roaming number message from the HLR to the serving MSC;

f) reserving the mobile subscriber number in the serving MSC while returning a roaming number for the MS to the HLR in a provide roaming number result message;

g) determining by an access server identification means in the HLR based on the roaming number for the MS, an access server address for a second access server;

h) sending a send routing information result message from the HLR to the first access server, said send routing information result message including the access server address and the roaming number for the MS;

i) sending data packets from the first access server to the second access server to route the connection setup message to the selected second access server; and j) setting up the connection from the TE to the MS through the selected second access server by sending an initial address message to the serving MSC to set up a circuit-switched connection between the serving MSC and the MS.

4. A method for setting up connections from a terminal equipment (TE) of a first communication network to a mobile terminal (MS) of a mobile communication network, the connections being routed from the TE through one or more access servers to the MS, said method comprising the steps of:

a) sending a connection setup message containing an Internet Protocol (IP) address or a mobile subscriber number from the TE to a first access server;

b) extracting by the first access server, the mobile subscriber number based on the connection setup message;

c) sending to a home location register (HLR) in the mobile communication network, a send routing information message that includes the mobile subscriber number;

d) determining by the HLR based on the mobile subscriber number, a serving mobile switching center (MSC) currently serving the MS;

e) sending a provide roaming number message from the HLR to the serving MSC;

f) reserving the mobile subscriber number in the serving MSC while returning a roaming number for the MS to the HLR in a provide roaming number result message;

g) sending a send routing information result message from the HLR to the first access server, said send routing information result message including the roaming number for the MS and call processing specific characteristics;

h) determining by an access server identification means associated with the first access server, an access server address for a second access server, said second access server address being determined based on the call processing specific characteristics of the send routing information result message;

i) sending data packets from the first access server to the second access server to route the connection setup message to the selected second access server; and j) setting up the connection from the TE to the MS through the selected second access server by sending an initial address message to the serving MSC to set up a circuit-switched connection between the serving MSC and the MS.

5. A method for setting up connections from a terminal equipment (TE) of a first communication network to a mobile terminal (MS) of a mobile communication network, the connections being routed from the TE through one or more access servers to the MS, said method comprising the steps of:

a) sending a connection setup message from the TE to a first access server;

b) selecting a second access server from an access server identification means based on a location of the MS in the mobile communication network and/or call processing specific characteristics indicating a specific type of call processing of the call in the first communication network and/or the mobile communication network;

c) sending a message from the first access server to the TE indicating the selected second access server address;

d) routing the connection setup message from the TE to the selected second access server; and d) setting up the connection from the TE to the MS through the selected second access server.

6. A communication system including a first communication network having at least one terminal equipment (TE) connected thereto, and including a mobile communication network having at least one mobile terminal (MS) connected thereto, wherein a connection between the TE and the MS is routed through one or more access servers, said system comprising:

a first access server that receives a connection setup message from the TE, and extracts MS identification information from the connection setup message;

access server identification means storing a correspondence relationship between access server identifications and either a plurality of locations of the MS in the mobile communication network, and/or call processing specific characteristics indicating a specific type of call processing of the call in the first communication network and/or the mobile communication network, said call processing specific characteristics being selected from a group consisting of:

detection of congestion in a candidate second access server;

distribution of traffic load in the, candidate second access servers;

required/preferred bearer services;

required specific gateway functionalities;

required specific hardware in the second access server;

required specific data link protocols; and required specific protocols to obtain special functionalities;

selection means for selecting a second access server from the access server identification means based on a location of the MS in the mobile communication network, and/or call processing specific characteristics;

routing means within the TE for routing a connection setup message sent from the TE to the selected second access server, wherein the first access server sends a message to the TE indicating the selected second access server address; and connection setup means for setting up the connection from the TE to the MS through the selected second access server.

* * * * *